United States Patent [19]

Erdt

[11] 4,375,931

[45] Mar. 8, 1983

[54] STAND FOR SUPPORTING A DRILLING TOOL

[75] Inventor: Wolfgang Erdt, Munich, Fed. Rep. of Germany

[73] Assignee: Hilti Aktiengesellschaft, Schaan, Liechtenstein

[21] Appl. No.: 204,193

[22] Filed: Nov. 5, 1980

[30] Foreign Application Priority Data

Nov. 7, 1979 [DE] Fed. Rep. of Germany ....... 2944966

[51] Int. Cl.³ .............................................. B23B 39/00

[52] U.S. Cl. .................................. 408/234; 308/3 A; 408/129; 408/712

[58] Field of Search ............... 408/241, 234, 237, 712, 408/135, 129; 308/3 A; 409/236, 241; 29/26 R, 26 B

[56] References Cited

U.S. PATENT DOCUMENTS

| | | | |
|---|---|---|---|
| 1,331,949 | 2/1920 | Baldwin | 408/129 |
| 2,868,043 | 1/1959 | Robbins | 408/135 |
| 2,965,009 | 12/1960 | Schotthoefer | 408/129 X |
| 3,745,838 | 7/1973 | Brems | 408/135 X |
| 3,971,599 | 7/1976 | Shio | 308/3 A |

FOREIGN PATENT DOCUMENTS

| | | | |
|---|---|---|---|
| 685681 | 5/1964 | Canada | 408/138 |
| 2556468 | 6/1977 | Fed. Rep. of Germany | 308/3 A |
| 2302448 | 9/1976 | France | 308/3 A |
| 2445756 | 9/1980 | France | 408/135 |
| 105541 | 7/1924 | Switzerland | 308/3 A |
| 1220106 | 5/1968 | United Kingdom | 308/3 A |
| 389302 | 11/1973 | U.S.S.R. | 308/3 A |

*Primary Examiner*—William R. Briggs
*Attorney, Agent, or Firm*—Toren, McGeady and Stanger

[57] ABSTRACT

In a stand for supporting a drilling tool, a guide block is movably supported on a guide column. The drilling tool is attached to the guide block. Rollers are mounted in the guide block and contact the guide column for effecting rolling movement of the block along the column. Elastic members associated with the rollers assure contact between the rollers and the column.

3 Claims, 2 Drawing Figures

STAND FOR SUPPORTING A DRILLING TOOL

SUMMARY OF THE INVENTION

The present invention is directed to a stand for supporting a drilling tool in which a guide block or slide supporting the drilling tool is movable along a guide column. Rolling movement of the guide block along the guide column is effected by rollers mounted in the guide block.

In a conventional drill stand a guide block is slidable along a guide column by means of plate or bar-shaped guide elements in the guide block. These guide elements usually consist of metals or alloys with good lubricating properties.

For smaller drilling devices, such as table drills, where, as is known, only relatively limited forces occur so that the guidance of the guide block is not exposed to any heavy stress, such sliding guidance is suitable. Sliding guidance has only a limited use in large devices, because relatively high forces must, as a rule, be absorbed by the guiding surfaces. Under such circumstances, sliding guidance has the disadvantages of high sliding friction and considerable wear.

To limit friction and wear, steel rollers have been used as guide elements in diamond-core drilling devices. These guiding elements are held in the guide block so that they do not move radially.

A disadvantage experienced in both known slide guidance and roller guidance arrangements is that the smallest unevenness of the guiding surfaces on the guide column, when in contact with the guide elements, tend to jam the movement of the guide block or to cause undue increased play. Therefore, a costly requirement in known drill stands is the finishing of the guide column surfaces in an extremely precise manner to prevent any unevenness. The peripheral outline of the guide column must be exactly adjusted to the cross-section determined by the guide elements.

Therefore, it is the primary object of the present invention to provide roller supports for a guide block which compensate for any unevenness or dimensional deviations in the guide column.

In accordance with the present invention, the adjustment of the guide block to the guide column, which preferably has a square cross-section, is afforded by elastic compensating elements associated with the rollers.

Elastic compensating elements permit a flexible adjustment of the rollers in the guide block to the surfaces of the guide column along which the rollers move. Any dimensional deviations in the cross-section of the guide column and any unevenness in the surfaces along which the rollers move are compensated for by the elastic element so that no jamming of the guide block occurs. As compared to known drill stands, no readjustment of the guiding means is necessary.

It may be advantageous to support one or more of adjoining guiding surfaces of the guide block on the guide column using known guide elements, that is, without employing elastic compensating elements for the guide elements. The other surfaces of the guide block are supported in rolling contact with the guide column by rollers and associated elastic compensating elements. A considerable advantage of the present invention is the avoidance of the precise preparation of the guide column surfaces which is both time-consuming and costly.

Preferably, the elastic compensating elements are in the form of sleeve-like elastic jackets fitted around the rollers. The jackets are formed of a wear-resistant material, such as rubber or a plastics material. As a practical matter the jackets can be pulled onto the rollers which preferably are made of steel and the surfaces of the rollers should be roughened to provide a tightly fitting engagement of the jackets about the rollers.

Any number of rollers provided with jackets can be mounted in the guide block so that the stresses originating from the drilling device can be absorbed by the guiding surfaces. The rollers are rotatably supported at each end in the guide block and the center portion of each roller supports one or several sleeve-like jackets which roll along the surface of the guide column. As an alternative, the rollers can be supported at only one end within the guide block with the sleeve-like jackets being provided on that portion of the rollers which extend from the support. In each embodiment, the sleeve-like jackets rolling on the surface of the guide column provide, depending on their thickness, the desired compensation of any unevenness in the surfaces of the guide column.

In another embodiment of the invention, the compensating elements are in the form of elastic bearing parts supporting the rollers within the guide block. Compression or tension springs or support blocks formed of an elastic material, such as rubber, are suitable for use as elastic bearing parts. These elastic bearing parts press the rollers, preferably formed of steel, against the surfaces of the guide column which may have a certain degree of unevenness. It is possible within the range of spring deflection afforded by these parts to adjust the cross-section defined by the rollers into contact with the guide column.

The elastic compensating elements can act directly on the rollers or can bias the rollers via some other part of the guidance structure.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figures 1, 2:
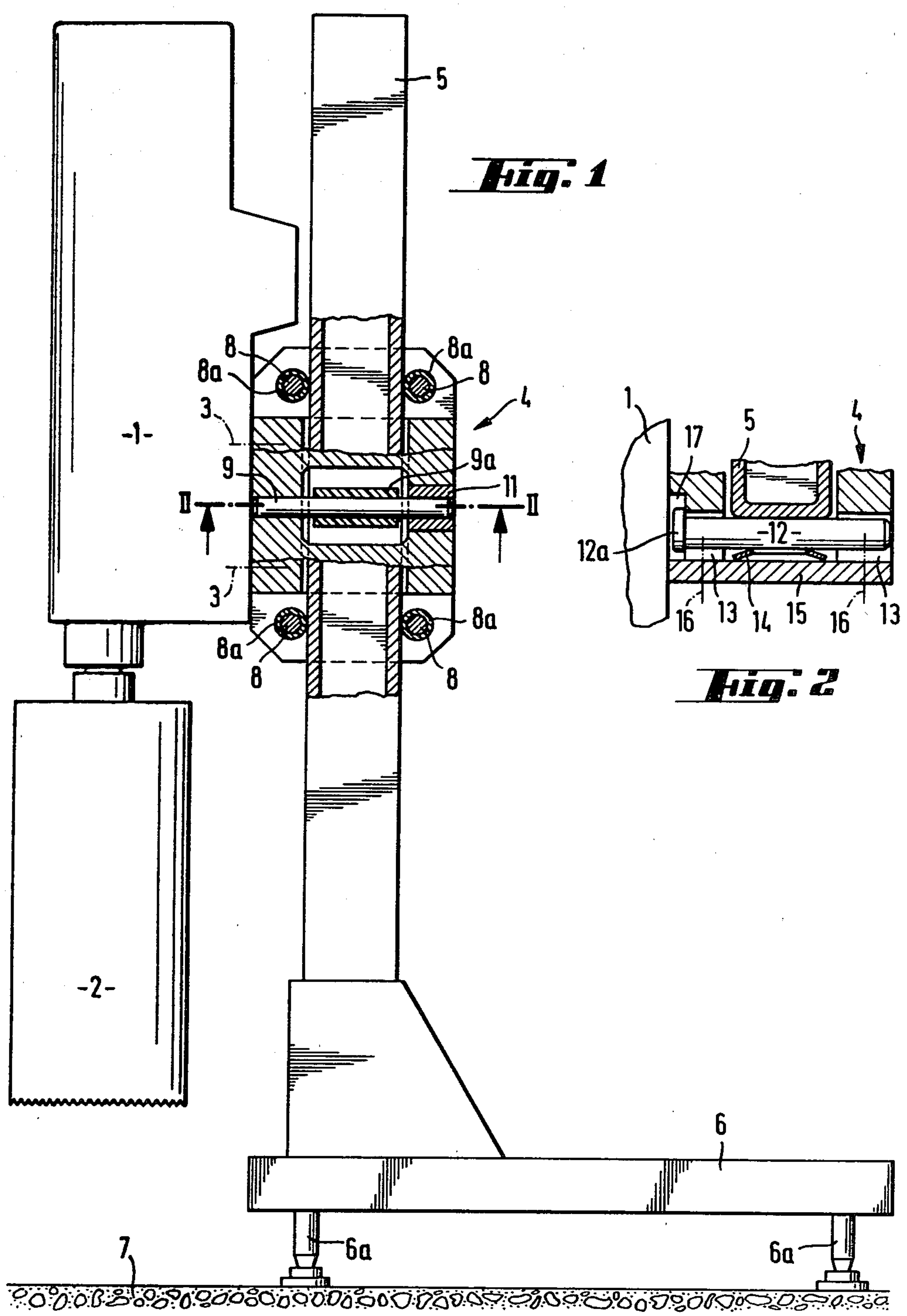
FIG. 1 is a side view, partly in section, of a stand for supporting a diamond-core drilling device.
FIG. 2 is a detail sectional view taken along the line II—II in FIG. 1 illustrating another embodiment of the invention.

In FIG. 1 a diamond-core drilling device consists of a body 1 and a hollow cylindrical drill 2, tipped with diamonds or similar cutting means and inserted into the front or downwardly facing end of the body. The body 1 of the drilling device is connected by screws 3, shown only schematically, to a guide block 4 with the side of the guide block directed toward the body 1 acting as a support bracket. The guide block 4 is supported on a guide column 5 for sliding movement in the longitudinal direction of the column which extends through the guide block. The guide column 5 is essentially square in cross-section and its lower end is connected to a base plate 6 from which legs 6*a* depend downwardly and are supported on a material 7 to be drilled. Legs 6*a* are retractable into the base plate so that the base plate can be fixed on the material 7 to be drilled by suction while the drilling device is being operated.

In FIG. 1 two different planes are shown through the guide block 4. The upper and lower regions of the guide block 4 are cut in the same plane revealing four rotatably mounted rollers 8, two on each side of the guide column 5. In each pair of rollers 8 one roller is aligned above the other and both rollers are in contact with the surface of the guide column. Each roller is enclosed by a sleeve-like elastic jacket 8*a* formed of hard rubber and disposed in closely fitting engagement with the roller. While the drilling device is being used, these four rollers 8 absorb the majority of the forces generated during the forward movement of the device.

In the central region of the guide block 4 spaced between the upper and lower rollers 8 two additional rollers 9, only one is shown, are arranged each on an opposite side of the guide column with the rollers 9 disposed perpendicularly of the rollers 8. Rollers 9 are preferably formed of steel, as are the rollers 8, and are rotatably mounted at their opposite ends in the guide block. For assembly reasons, one end of each roller 9 is held in a bearing bush 11 which has an outside diameter greater than that of the elastic jacket 9*a* encircling the roller. The four peripheral surfaces of the guide column 4 are in contact with rollers 8 or 9, that is, the sleeve-like jackets 8*a*, 9*a* fitted on these rollers contact the surfaces of the column.

In FIG. 2 a very similar embodiment of the elastic compensating elements is shown and could be used in place of the elastic jackets shown in FIG. 1. The parts in FIG. 2 are similar to those in FIG. 1 and are provided with the same reference numerals. The rolling support of the guide block 4 along the surfaces of the guide column 5 is provided by rollers 12, preferably formed of steel, with the rollers being in direct contact with the guide column surfaces. Rollers 12 are rotatably mounted in slots 13 and are displaceable outwardly from the guide column. Each roller 12 is pressed against the guide column 5 by an elastic compensating element in the form of a support block of rubber or, as shown in FIG. 2, by a cup spring 14. Cup spring 14 bears against a cover 15 fixed to the guide block 4 by means of screws 16, shown only schematically. Movement of the rollers 12 in their axial direction is prevented by a head 12*a* located on one end of the rollers and, as can be seen in FIG. 2, the head is located at the left end of the roller located within a recess 17 and the other end of the roller located in the opposite end of the slot 13.

Any uneveness or dimensional variations in the surfaces of the guide column 5 contacted by the rollers are compensated in each of the embodiments of FIG. 1 and FIG. 2 by elastic compensating elements formed either by the sleeve-like jackets 8*a*, 9*a* which yield elastically as they roll along the surface of the guide block, or by the rollers 12 which are biased against the surface of the guide column by the cup springs 14.

While specific embodiments of the invention have been shown and described in detail to illustrate the application of the inventive principles, it will be understood that the invention may be embodied otherwise without departing from such principles.

What is claimed is:

1. Stand for supporting a drilling tool comprising an elongated guide column, a guide block mounted on said guide column for movement in the elongated direction thereof, rollers rotatably supported in said guide block and in contact with said guide column for movably displacing said guide block along said guide column, means for elastically maintaining contact between said rollers and said guide column, said means for elastically maintaining contact comprises an elastic sleeve-like jacket laterally encircling and closely fitted on at least certain of said rollers so that said jacket bears in rotating contact with the surface of said guide column, thereby permitting a flexible adjustment of the rollers in said guide block to the surfaces of said guide column along which said rollers move.

2. Stand, as set forth in claim 1, wherein said elastic sleeve-like jacket is formed of a rubber material.

3. Stand, as set forth in claim 1, wherein said elastic sleeve-like jacket is formed of a plastics material.

* * * * *